US012806909B2

(12) United States Patent
Kamimura

(10) Patent No.: US 12,806,909 B2
(45) Date of Patent: Nov. 24, 2026

(54) LIQUID STORAGE CONTAINER

(71) Applicant: CANON KABUSHIKI KAISHA, Tokyo (JP)

(72) Inventor: Takayuki Kamimura, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/763,250

(22) Filed: Jul. 3, 2024

(65) Prior Publication Data

US 2025/0026124 A1 Jan. 23, 2025

(30) Foreign Application Priority Data

Jul. 19, 2023 (JP) ................................ 2023-117589
Apr. 8, 2024 (JP) ................................ 2024-061960

(51) Int. Cl.
*B41J 2/175* (2006.01)
*B05B 11/00* (2023.01)
*B65D 25/42* (2006.01)

(52) U.S. Cl.
CPC ....... *B41J 2/17509* (2013.01); *B41J 2/17523* (2013.01); *B05B 11/0056* (2013.01); *B41J 2/17506* (2013.01); *B41J 2/17513* (2013.01); *B65D 25/42* (2013.01)

(58) Field of Classification Search
CPC ............... B05D 11/0056; B41J 2/17506; B41J 2/17509; B65D 25/40; B65D 25/42; B67D 3/0035; B67D 3/0051
USPC .................................... 141/364, 365; 347/85
See application file for complete search history.

(56) References Cited

U.S. PATENT DOCUMENTS 153,393 A * 7/1874 Stoessiger .............. B65D 25/42 222/573
358,970 A * 3/1887 Foss ....................... B65D 25/42 222/574
530,587 A * 12/1894 Greene .................. B65D 25/42 222/574
1,426,846 A * 8/1922 Craig ..................... B65D 25/40 222/530

(Continued)

FOREIGN PATENT DOCUMENTS

JP 2013-000949 1/2013

OTHER PUBLICATIONS

U.S. Appl. No. 18/771,524, filed Jul. 12, 2024.

*Primary Examiner* — Robert K Arundale
(74) *Attorney, Agent, or Firm* — Venable LLP

(57) ABSTRACT

An ink storage bottle replenishes ink to an ink ejection apparatus ink tank. The ejection apparatus includes a print head and the ink tank. The ink storage bottle includes a filling port from which the ink is filled, an injection port and a spout pipe connected to the injection port from which the filled ink is injected into the ink tank, a filling port placement surface having the filling port, and an injection port placement surface, adjacent to the filling port placement surface, forming an ink storage space together with the filling port placement surface, in which the injection port is provided. When the ink storage bottle injects the ink from the injection port into the ink tank, the injection port is located at a higher position than the filling port. The bottle and the tank are engaged by inserting the spout pipe into a receptacle in the ink tank.

18 Claims, 8 Drawing Sheets

(56) References Cited

U.S. PATENT DOCUMENTS

| | | | | |
|---|---|---|---|---|
| 1,527,657 | A * | 2/1925 | Tarnowsky | B65D 25/42 222/564 |
| 1,641,051 | A * | 8/1927 | Rheney | B65D 25/42 210/244 |
| 5,108,016 | A * | 4/1992 | Waring | B01F 35/80 222/481.5 |
| 2005/0151809 | A1 * | 7/2005 | Corner | B41J 2/17523 347/86 |

* cited by examiner

LIQUID STORAGE CONTAINER

CROSS REFERENCE TO PRIORITY APPLICATION

This application claims the benefit of Japanese Patent Applications No. 2023-117589, filed Jul. 19, 2023, and No. 2024-061960, filed Apr. 8, 2024, each of which is hereby incorporated by reference herein in its entirety.

BACKGROUND OF THE INVENTION

Field of the Invention

The disclosure relates to a liquid storage container and specifically relates to a liquid storage container configured to store a liquid, the liquid storage container capable of being refilled with a liquid such as an ink and supplying the refilled liquid to an external apparatus.

Description of the Related Art

As a liquid storage container of this type, for example, there is an ink tank configured to store an ink to be supplied to an ink ejection head in an inkjet printing apparatus and be refilled with the ink in a case when the stored ink runs low. As a liquid storage container in another model, there is a liquid storage bottle configured to store an ink to be refilled to an ink tank as described above and supply the ink to the ink tank. In some of these liquid storage containers, an injection port for supplying a liquid to an external apparatus and a filling port for refilling the liquid are separately provided from the viewpoint of user's work efficiency.

In a liquid storage container described in Japanese Patent Laid-Open No. 2013-949 (hereafter referred to as the '949 document), an injection port for supplying a liquid to an ejection head of a liquid ejection apparatus is provided at a bottom portion of the liquid storage container, whereas a filling port for refilling the liquid is provided at a top portion of the liquid storage container.

In the liquid storage container described in the '949 document, however, the injection port for supplying the ink to another predetermined part (ejection head) is located at the lowest position in the container during the injection. For this reason, if a foreign substance gets mixed in the storage container at a time of the liquid filling into the storage container or if a solidified ink particle, or the like, is generated, the foreign substance may move to the lowest position in the container at a time of the liquid injection, and then move to the predetermined part along with the liquid supply. In this case, if the predetermined part is, for example, the ejection head, the moved foreign substance impairs the ejection function.

SUMMARY OF THE INVENTION

The disclosure provides a liquid storage container including a filling port from which a liquid is filled, an injection port from which the filled liquid is injected into an external apparatus, a filling port placement surface, in which the filling port is provided, and an injection port placement surface, which is adjacent to the filling port placement surface, which forms a liquid storage space together with the filling port placement surface, and in which, the injection port is provided, wherein in a posture of the liquid storage container in injecting the liquid from the injection port into the external apparatus, the injection port is located at a higher position than is the filling port.

Further features of the invention will become apparent from the following description of exemplary embodiments with reference to the attached drawings.

DESCRIPTION OF THE EMBODIMENTS

Hereafter, embodiments for carrying out the disclosure will be described in detail with reference to the drawings. It should be noted that the dimensions, materials, shapes, and relative positions of constituent components in the following embodiments can be altered as appropriate depending on a structure and various conditions of a liquid ejection head, and the like, to which the disclosure is applied. The scope of the disclosure should not be limited to the following embodiments.

Figure 1:
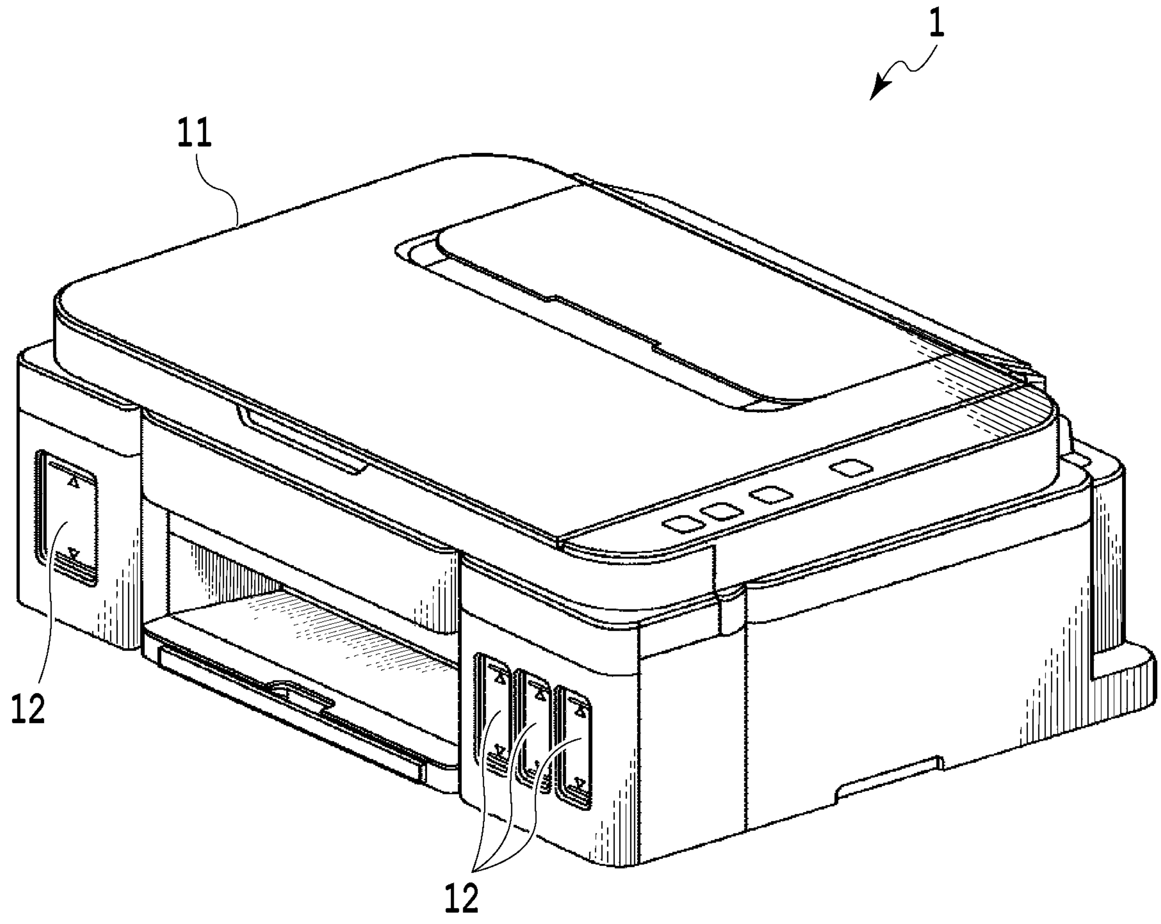
FIG. 1 is a perspective view illustrating a liquid ejection apparatus.

FIG. 1 is a perspective view illustrating an external appearance of a liquid ejection apparatus 1 that uses, as a refill container, a liquid storage container according to an embodiment of the disclosure. The liquid ejection apparatus 1 is a printing apparatus configured to perform printing in a serial method, and includes a housing 11 and liquid tanks 12 placed inside the housing 11. The liquid tanks 12 store inks as liquids to be ejected from a print head onto a printing medium (not illustrated).

Figure 2:
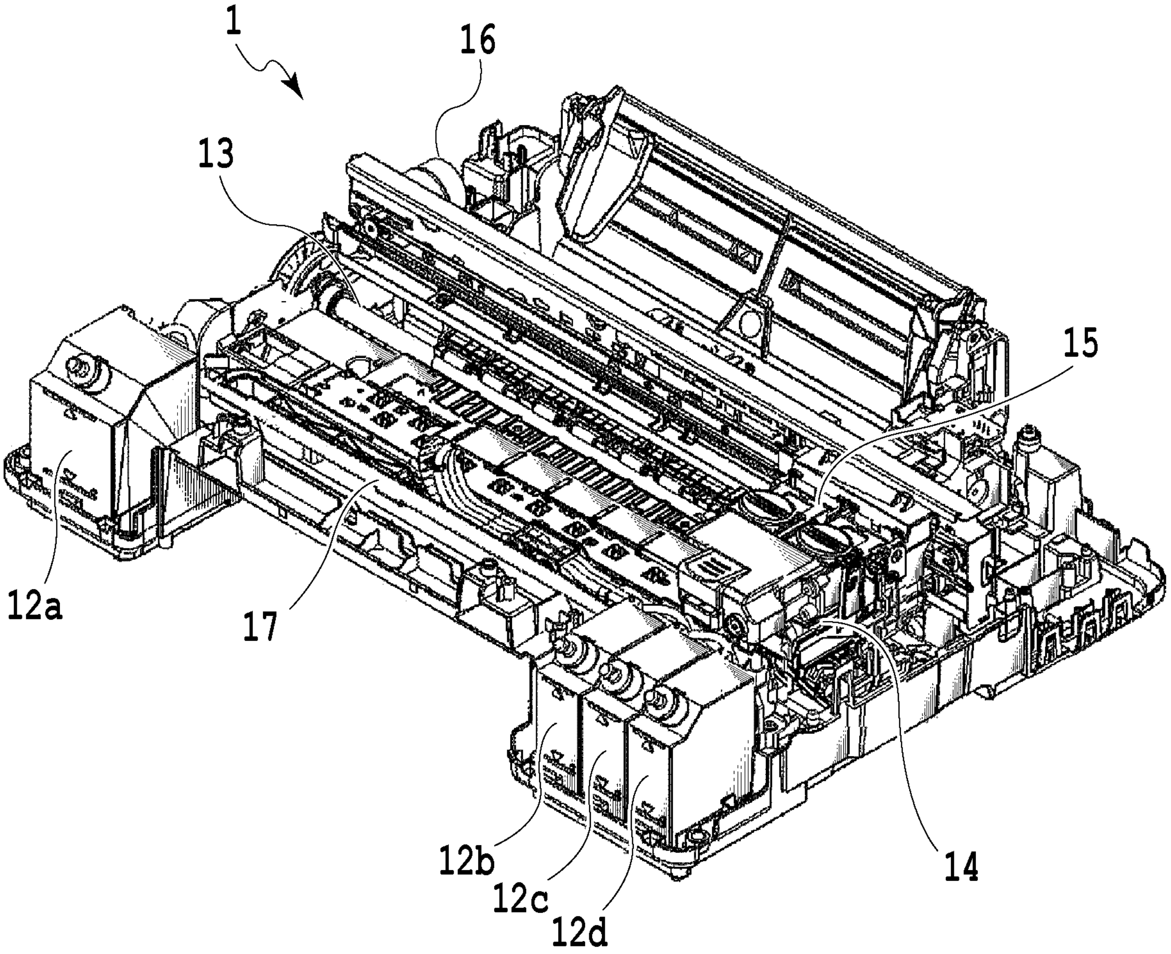
FIG. 2 is a perspective view illustrating an internal structure of essential parts of the liquid ejection apparatus illustrated in FIG. 1.

FIG. 2 is a perspective view illustrating an internal structure of essential parts of the liquid ejection apparatus 1 illustrated in FIG. 1. As illustrated in FIG. 2, the liquid ejection apparatus 1 includes a conveyance roller 13 for conveying a printing medium (not illustrated), a carriage 15 on which a print head 14 for ejecting the inks is removably mounted, and a carriage motor 16 for driving the carriage 15. The printing medium is, for example, paper, or the like, and may be any medium on which an image can be formed with the liquids ejected from the print head 14.

The conveyance roller 13 is intermittently driven to rotate to transport the printing medium intermittently. The carriage 15 is driven to rotate by the carriage motor 16 to reciprocate in directions intersecting a direction in which the printing medium is conveyed by the conveyance roller 13. An image, or the like, is printed on the printing medium by repeating a step of ejecting the inks onto the printing medium from ejection ports of the print head 14 on the carriage 15 during the above reciprocating scanning and a step of conveying the printing medium by a predetermined amount.

The inks are stored in the liquid tanks 12, supplied to the print head 14 through liquid channels 17, and ejected from the print head 14. In the embodiment, inks of four colors (for example, cyan, magenta, yellow, and black) are used as the liquids, and four color-specific liquid tanks 12*a* to 12*d* for storing the respective color inks are provided as the liquid tanks 12. The color-specific liquid tanks 12*a* to 12*d* are arranged at a front side portion of the liquid ejection apparatus 1 inside the housing 11.

In the embodiment, these liquid tanks 12*a* to 12*d* are filled and refilled with the inks from respectively corresponding liquid storage bottles (not illustrated).

First Embodiment

Figures 3A, 3B, 3C:
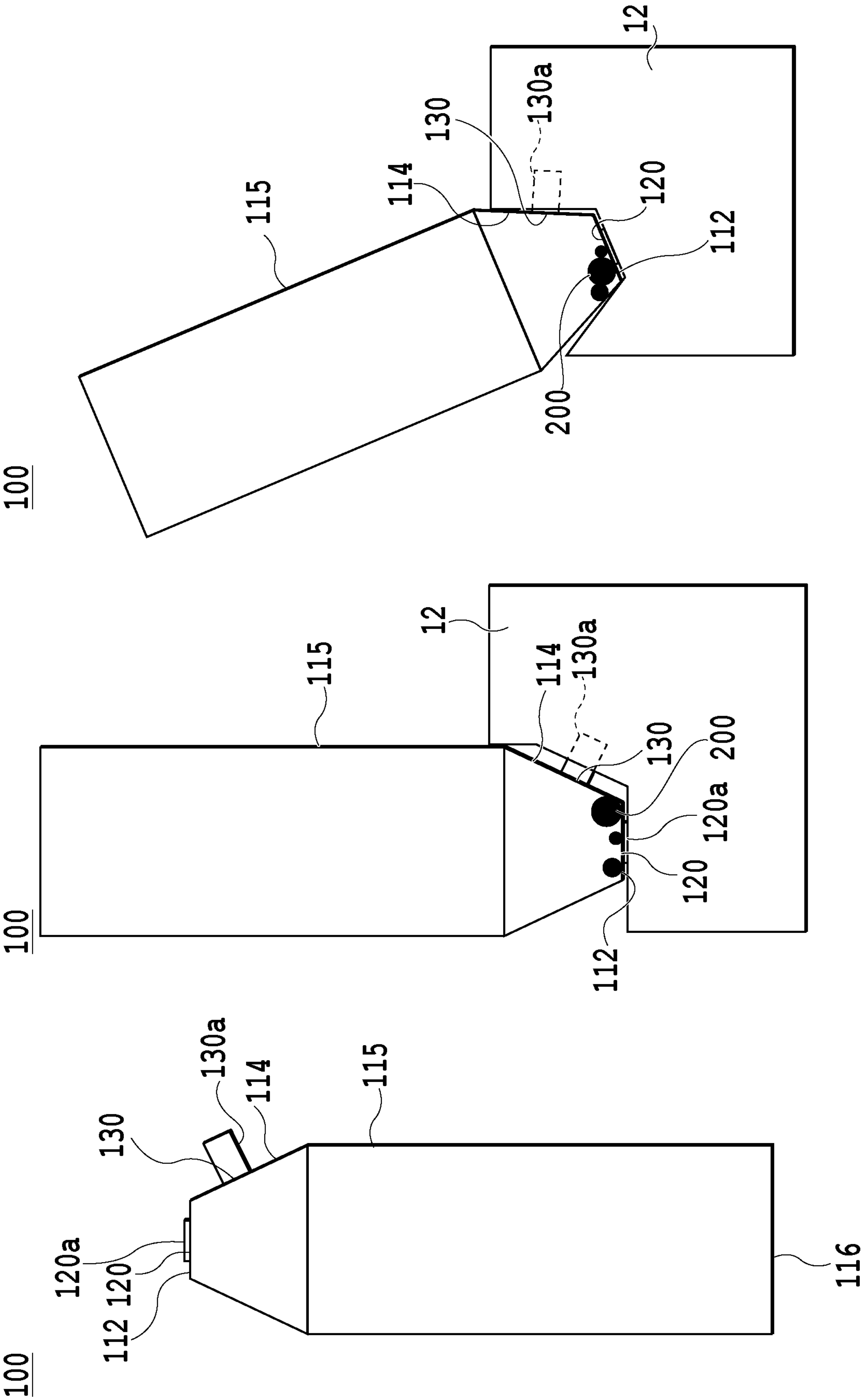
FIG. 3A is a diagram for explaining a liquid storage bottle as a liquid storage container according to a first embodiment of the disclosure.
FIG. 3B is a diagram for explaining the liquid storage bottle as the liquid storage container according to the first embodiment of the disclosure.
FIG. 3C is a diagram for explaining the liquid storage bottle as the liquid storage container according to the first embodiment of the disclosure.

FIG. 3A to 3C are diagrams for explaining a liquid storage bottle as a liquid storage container according to a first embodiment of the disclosure.

FIG. 3A illustrates a standing state of a liquid storage bottle 100. The liquid storage bottle 100 in the standing state has, as outer surfaces, a top surface 112, a first side surface 114 that is a sloped surface of a truncated cone portion adjacent to the top surface, a second side surface 115 that is a side surface of a cylindrical portion adjacent to the first side surface 114, and a bottom surface 116 that is opposed to the top surface 112 and that is adjacent to the second side surface 115. The top surface 112 is a filling port placement surface of the liquid storage bottle 100, and is provided with a filling port 120 that is an opening for filling and refilling the liquid storage bottle 100 with the ink.

The top surface 112 forms a liquid storage space of the liquid storage bottle 100 together with the first side surface 114. More specifically, the top surface 112 forms the liquid storage space of the liquid storage bottle 100 together with the first side surface 114 and the second side surface 115.

This filling port 120 can be closed with a lid 120*a*. The first side surface 114 is an injection port placement surface of the liquid storage bottle 100, and is provided with an injection port 130 for refilling the aforementioned liquid tank 12 in FIG. 1 with the ink. A spout pipe 130*a* is provided so as to be connected to the injection port 130. This spout pipe 130*a* is a cylindrical pipe extending in an outward direction approximately vertical to the first side surface 114, and makes it easy to inject the ink into the liquid tank 12 from the injection port 130. After the liquid storage bottle 100 runs low or out of the stored ink as a result of injecting the ink into the liquid tank 12, the liquid storage bottle 100 is reusable by being filled with the ink again.

Regarding a positional relationship between the filling port 120 and the injection port 130 according to the first embodiment, in the standing state of the liquid storage bottle 100 (FIG. 3A), the filling port 120 is arranged at the highest level in the liquid storage bottle 100, and the injection port 130 is arranged in the first side surface 114 located below the highest level. The first side surface 114 has a shape tapered toward the filling port 120. As a result, first, since the injection port 130 is provided in the first side surface 114, the injection port 130 can be oriented to face upward from the horizontal, and an ink leakage through the injection port 130 can be prevented in the standing state of the liquid storage bottle 100. Secondly, in a state where the ink is injected into the liquid tank 12 as illustrated in FIG. 3B, the filling port 120 is located at the lowest level in the liquid storage bottle 100 and the injection port 130 is located above the lowest level. As a result, even if foreign substances 200 exist in the liquid storage bottle 100, the foreign substances 200 stay between the injection port 130 and the filling port 120 (illustrated as black circles 200 in FIG. 3B), and the foreign substances 200 are prevented from moving into the liquid tank 12 through the injection port 130.

There may be a case when the filling port 120 is not located at the lowest level in the injection to the liquid tank 12 as in an example illustrated in FIG. 3C. Even in this injection state, the injection port 130 only has to be located at a higher position than the filling port 120 is.

In order to more certainly prevent foreign substances from mixing in, filters may be provided to the filling port 120 and the injection port 130. In addition, in order to prevent a user from confusing the injection port 130 and the filling port 120, their functions may be indicated near the respective ports 130 and 120 on an outer surface of the liquid storage bottle 100.

As described above, even though the liquid storage bottle 100 according to the embodiment has the structure including the filling port 120 in addition to the injection port 130, it is possible to reduce the risk that foreign substances may enter the liquid tank 12 from the injection port during the liquid filling. In other words, the liquid storage bottle 100 according to the embodiment has the structure capable of promoting reuse of the liquid storage bottle 100 because the liquid storage bottle 100 ensures the user's work efficiency and is easy to reuse by being refilled with the liquid. In sum, the technique described herein can contribute to the realization of a sustainable society such as a decarbonized/recycling society.

Second Embodiment

Figure 4A:
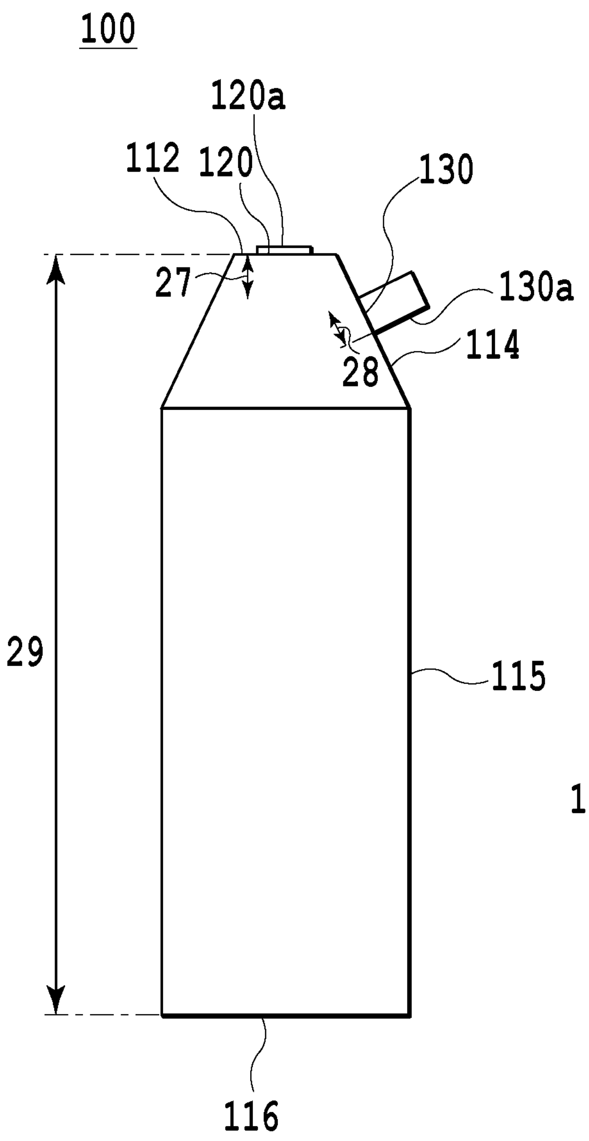
FIG. 4A is a diagram for explaining a liquid storage bottle as a liquid storage container according to a second embodiment of the disclosure.
Figure 4B:
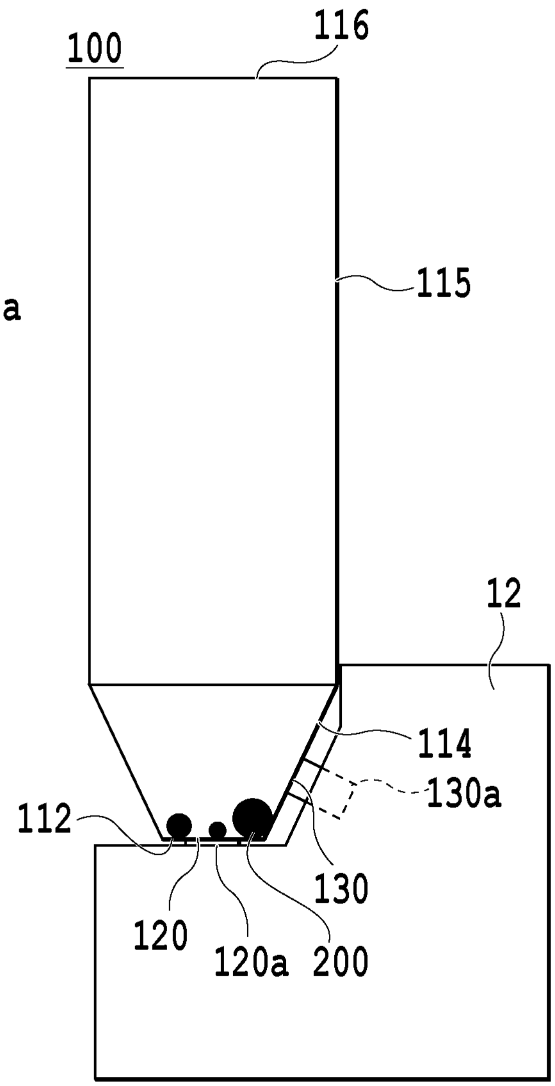
FIG. 4B is a diagram for explaining the liquid storage bottle as the liquid storage container according to the second embodiment of the disclosure.

FIGS. 4A and 4B are diagrams for explaining a liquid storage bottle as a liquid storage container according to a second embodiment of the disclosure. The liquid storage bottle in the embodiment has the aforementioned positional relationship between the filling port 120 and the injection port 130 according to the first embodiment, and additionally is defined as having the following relationship between a vertical distance between the filling port 120 and the injection port 130 and an opening width of the injection port 130.

As illustrated in FIG. 4A, a distance 27 between the top surface 112 in which the filling port 120 is opened and the highest end of the injection port 130 in the first side surface 114 (the distance between the injection port and the filling port in a direction perpendicular to the filling port placement surface) is determined to be equal to or greater than an opening width 28 of the injection port 130 (the diameter of the opening in the embodiment). Thus, even if a foreign substance 200 larger than the opening width 28 of the injection port 130 exists in the liquid storage bottle 100, the foreign substance 200 can be confined below the injection port 130 in the injection state illustrated in FIG. 4B. As a result, the large foreign substance 200 can be prevented from, for example, closing the injection port 130 and stopping the injection.

On the other hand, if the above distance 27 is too large, the amount of the ink remaining in the bottle 100 without being injected will increase, which is undesirable. For this reason, in the embodiment, the distance 27 is set to 1/20 or more to 1/5 or less of a height 29 of the liquid storage bottle 100 (a distance between the top surface 112 and the surface (the bottom surface 116) opposed to the top surface 112 in the liquid storage bottle). For example, if the height 29 of the liquid storage bottle 100 is 100 mm, the distance 27 between the injection port 130 and the filling port 120 may be set to 6 mm. As a result, it is possible to obtain a liquid storage bottle in which the foreign substance 200 can be confined between the injection port 130 and the filling port 120 during the ink injection and the amount of the remaining ink can be reduced.

Third Embodiment

Figure 5C:
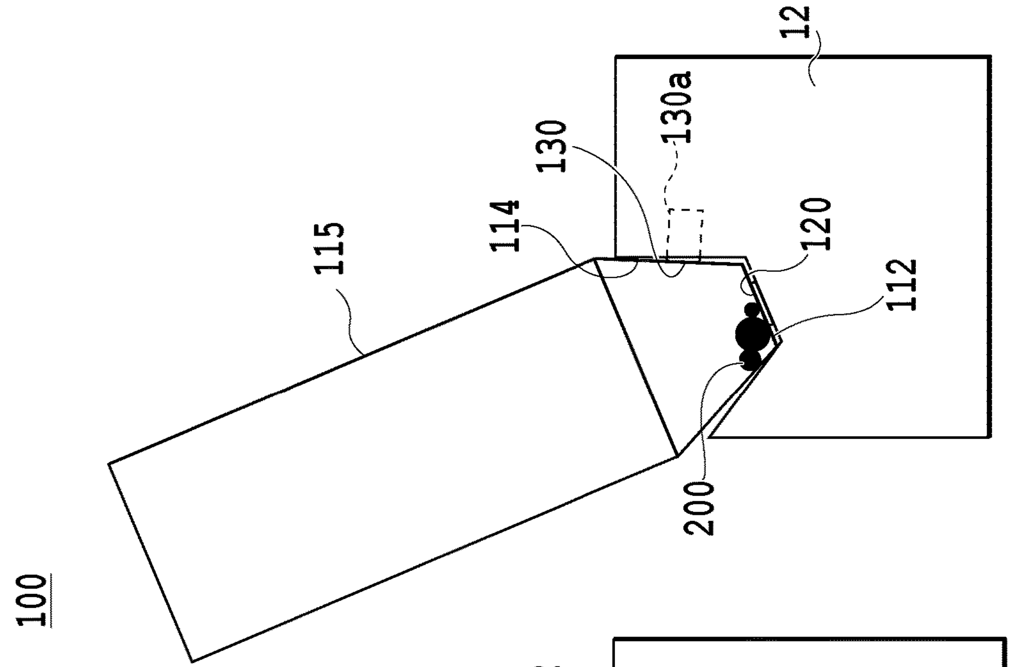
FIG. 5C is a diagram for explaining the liquid storage bottle as the liquid storage container according to the third embodiment of the disclosure.
Figure 5B:
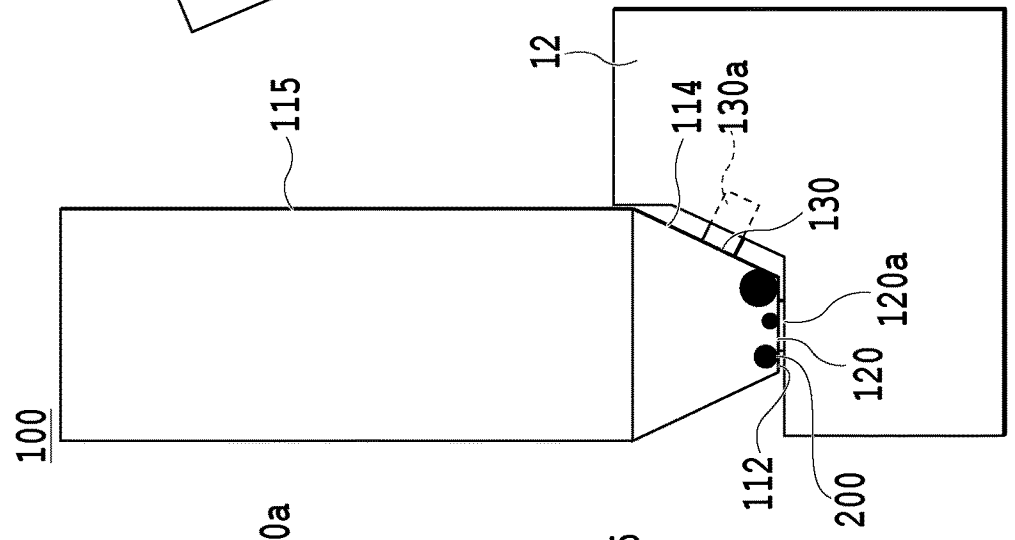
FIG. 5B is a diagram for explaining the liquid storage bottle as the liquid storage container according to the third embodiment of the disclosure.
Figure 5A:
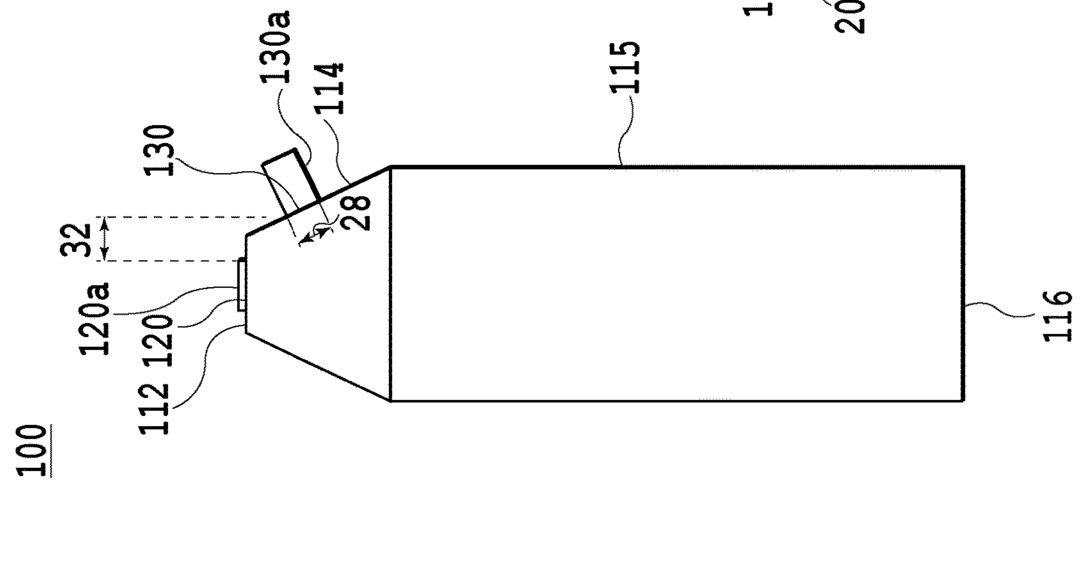
FIG. 5A is a diagram for explaining a liquid storage bottle as a liquid storage container according to a third embodiment of the disclosure.

FIGS. 5A to 5C are diagrams for explaining a liquid storage bottle as a liquid storage container according to a third embodiment of the disclosure. The liquid storage bottle in the embodiment has the aforementioned structure according to the first embodiment and additionally is defined as having the following relationship between a horizontal distance between the filling port 120 and the injection port 130 and the opening width 28 of the injection port 130.

As illustrated in FIG. 5A, in the horizontal direction, a distance 32 between the end of the filling port 120 closest to the injection port 130 and the end of the injection port 130 closest to the filling port 120 (the distance between the injection port and the filling port in the direction orthogonal to the direction perpendicular to the filling port placement surface) is determined to be larger than the opening width 28 of the injection port 130. As a result, even if a foreign substance 200 larger than the opening width 28 of the injection port 130 exists in the liquid storage bottle 100 in filling or refilling the liquid storage bottle 100 with the ink via the filling port 120, the foreign substance 200 can be kept away from the injection port 130 in the injection state illustrated in FIG. 5B. As a result, the large foreign substance 200 can be prevented from, for example, closing the injection port 130 and stopping the injection. In the embodiment, for example, in a case where the opening width 28 is 5 mm, the minimum horizontal distance 32 between the filling port 120 and the injection port 130 is 6 mm.

Fourth Embodiment

Figure 6A:
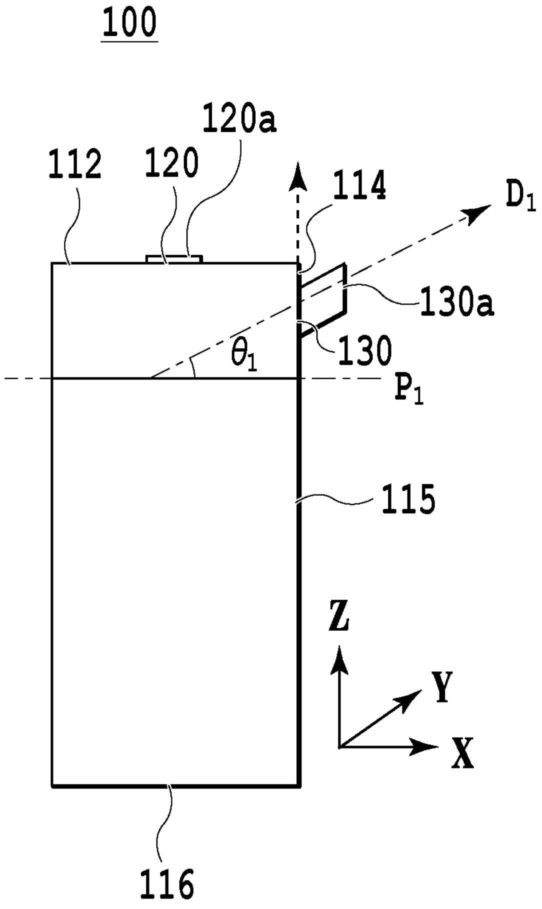
FIG. 6A is a diagram for explaining a liquid storage bottle as a liquid storage container according to a fourth embodiment of the disclosure.
Figure 6B:
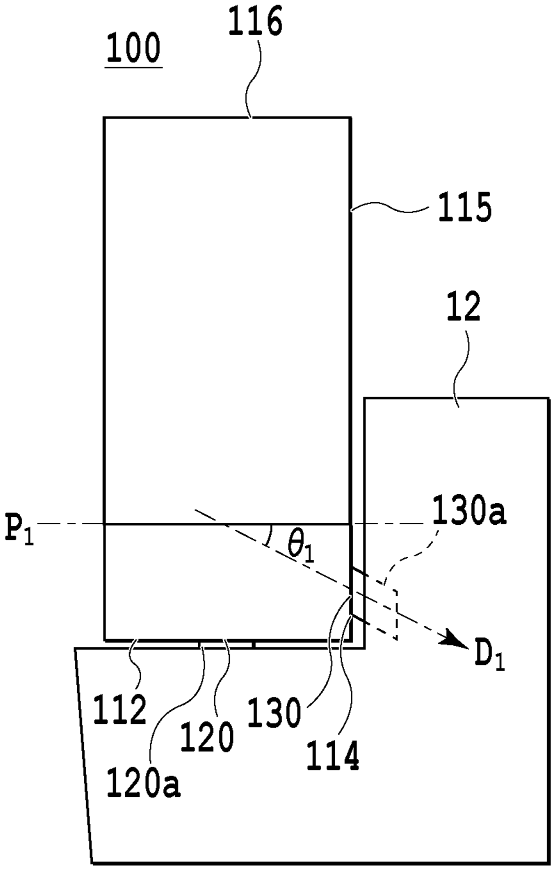
FIG. 6B is a diagram for explaining the liquid storage bottle as the liquid storage container according to the fourth embodiment of the disclosure.

FIGS. 6A and 6B are diagrams for explaining a liquid storage bottle as a liquid storage container according to a fourth embodiment of the disclosure. The liquid storage bottle in the embodiment relates to a structure in which an angle of the spout pipe **130*a* extending from the injection port 130 is determined in addition to the aforementioned structure according to the first embodiment. Specifically, as illustrated in FIGS. 3 to 5 for the first to third embodiments, the spout pipe 130*a* extends in an obliquely upward direction in the standing state of the liquid storage bottle. As a result, due to the action of gravity, a foreign substance can be prevented from entering the spout pipe 130*a* through the injection port 130**.

As in the embodiment, in a case where a side surface 114 is a surface that extends along the vertical direction and is orthogonal to the top surface 112, the angle of the obliquely upper direction can be expressed as an angle θ1 illustrated in FIG. 6A. More specifically, the angle θ1 formed between an extending direction D1 of the spout pipe **130*a* and the bottom surface 116 of the liquid storage bottle 100 in the standing state is a value within a range of more than zero degrees (0°) to less than ninety degrees (90°). Preferably, the angle θ1 is a value within a range of seventy degrees (70°) or more to less than ninety (90°). In the case when the angle θ1 is within this range, a foreign substance can be more effectively prevented from entering the spout pipe 130*a*** as described above.

In addition, in the case when the spout pipe **130*a* faces upward from the horizontal as described above, the ink can be prevented from leaking through the injection port 130 and it is easier to inject the ink into the liquid tank 12 from the injection port 130 because the injection port 130 faces downward from the horizontal when the ink is injected into the liquid tank 12**.

Fifth Embodiment

Figure 7A:
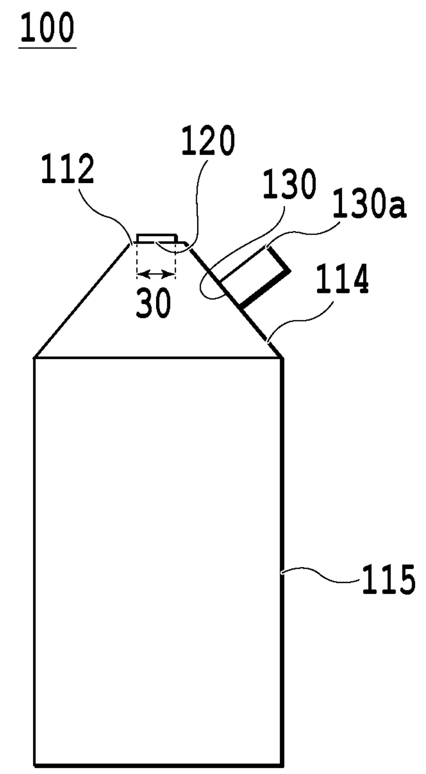
FIG. 7A is a diagram for explaining a liquid storage bottle as a liquid storage container according to a fifth embodiment of the disclosure.
Figure 7B:
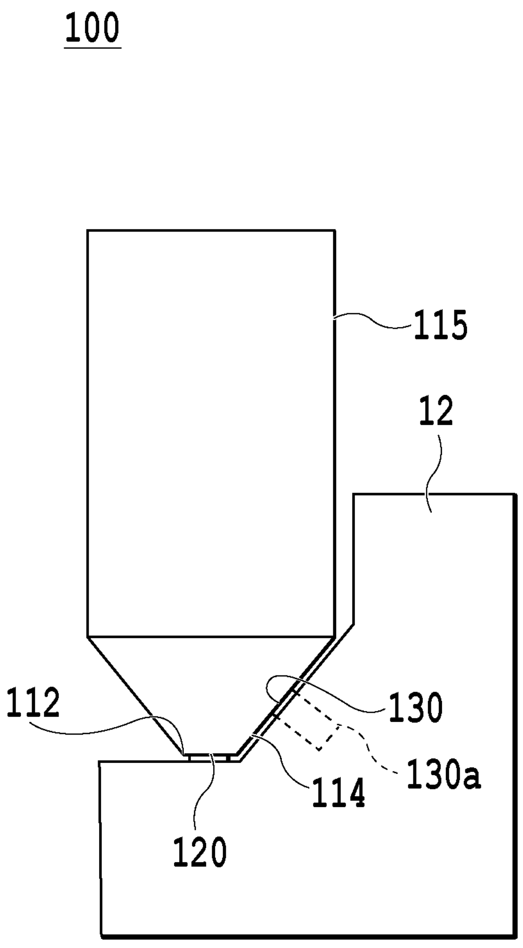
FIG. 7B is a diagram for explaining the liquid storage bottle as the liquid storage container according to the fifth embodiment of the disclosure.

FIGS. 7A and 7B are diagrams for explaining a liquid storage bottle as a liquid storage container according to a fifth embodiment of the disclosure. In addition to the aforementioned structure according to the first embodiment, the liquid storage bottle in the embodiment has a structure in which an area of the top surface 112 is reduced as compared with the liquid storage bottles in the first to third embodiments. Accordingly, an opening area of the filling port 120 is reduced.

As a result, the volume of a space formed between the injection port 130 and the filling port 120 can be reduced and therefore the amount of the ink that can remain in this space can be reduced.

Sixth Embodiment

Figure 8A:
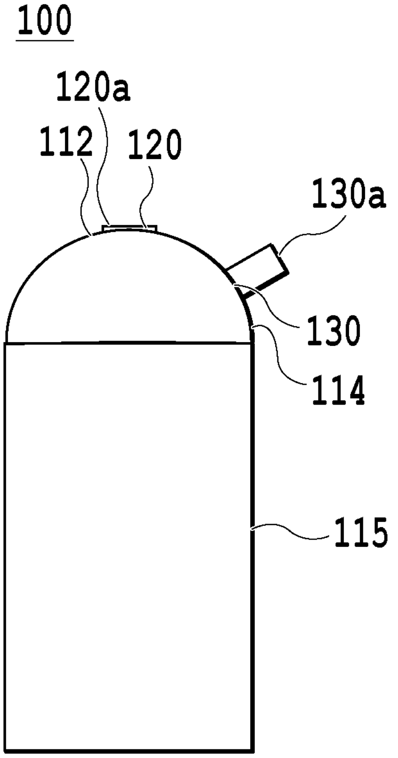
FIG. 8A is a diagram for explaining a liquid storage bottle as a liquid storage container according to a sixth embodiment of the disclosure.
Figure 8B:
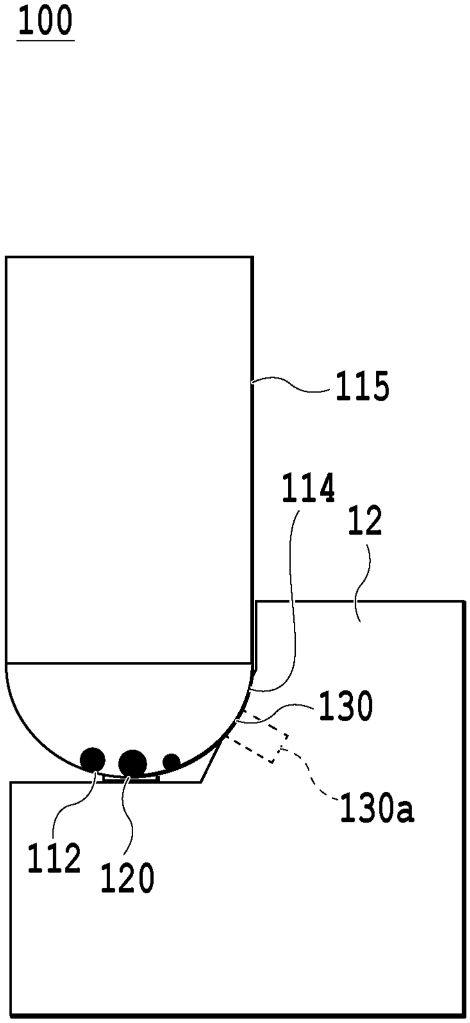
FIG. 8B is a diagram for explaining the liquid storage bottle as the liquid storage container according to the sixth embodiment of the disclosure.

FIGS. 8A and 8B are diagrams for explaining a liquid storage bottle as a liquid storage container according to a sixth embodiment of the disclosure.

The liquid storage bottle in the embodiment has a structure in which the top surface 112 and the first side surface 114 are curved surfaces in addition to the aforementioned structure according to the first embodiment.

Since the liquid storage bottle in the embodiment has such structure, possibly existing foreign substances are caused by the gravity to concentrate and remain near the lowest position in the liquid storage bottle 100 as illustrated in FIG. 8B when the ink is injected into the liquid tank 12 from the injection port 130. As a result, the foreign substances can be prevented from, for example, remaining near and sticking to the injection port 130.

Other Embodiments

It is clear from the above description that any combination of the first to sixth embodiments described above is included in an embodiment of the invention as long as it is not inconsistent to the gist of the invention.

In addition, the shape of the liquid storage container is not limited to the bottle shape, but the liquid storage container may be any container including a filling port placement surface provided with a filling port and an injection port placement surface provided with an injection port and satisfying the foregoing features in each of the embodiments.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

What is claimed is:

1. An ink storage bottle configured to replenish ink to an ink tank of an ink ejection apparatus, wherein the ink ejection apparatus includes (a) a print head and (b) the ink tank, which is for supplying the ink to the print head, the ink storage bottle comprising:

a filling port from which the ink is filled;

an injection port and a spout pipe connected to the injection port from which the filled ink is injected into the ink tank;

a filling port placement surface in which the filling port is provided; and an injection port placement surface which is adjacent to the filling port placement surface, which forms an ink storage space together with the filling port placement surface, and, in which, the injection port is provided, wherein in a posture of the ink storage bottle in injecting the ink from the injection port into the ink tank, the injection port is located at a higher position than is the filling port, and wherein the storage bottle and the ink tank are engaged by inserting the spout pipe into a receptacle formed in the ink tank.

2. The ink storage bottle according to claim 1, wherein a distance between the injection port and the filling port in a direction perpendicular to the filling port placement surface is greater than an opening width of the injection port.

3. The ink storage bottle according to claim 2, wherein the distance between the injection port and the filling port in the direction perpendicular to the filling port placement surface is 1/20 or more to 1/5 or less of a distance between the filling port placement surface and a surface of the ink storage bottle opposed to the filling port placement surface.

4. The ink storage bottle according to claim 1, wherein a distance between the injection port and the filling port in a direction orthogonal to a direction perpendicular to the filling port placement surface is greater than an opening width of the injection port.

5. The ink storage bottle according to claim 1, wherein an angle formed between an extending direction of the spout pipe and a surface of the liquid storage container opposed to the filling port placement surface is a value within a range of more than zero degrees (0°) to less than ninety (90°).

6. The ink storage bottle according to claim 5, wherein the angle formed between the extending direction of the spout pipe and the surface of the ink storage bottle opposed to the filling port placement surface is a value within a range of seventy degrees (70°) or more to less than ninety degrees (90°).

7. The ink storage bottle according to claim 1, wherein the injection port placement surface has a shape tapered toward the filling port.

8. The ink storage bottle according to claim 1, wherein the filling port placement surface and the injection port placement surface are curved surfaces.

9. The ink storage bottle according to claim 1, wherein indications indicating the injection port and the filling port are provided on the ink storage bottle.

10. The ink storage bottle according to claim 1, further comprising a lid configured to be able to open and to close the filling port.

11. The ink storage bottle according to claim 1, wherein, when the ink storage bottle is in a posture of injecting the ink from the injection port into the ink tank, ink is present in the ink storage space.

12. The ink storage bottle according to claim 1, wherein, when the ink storage bottle is in a posture of injecting the ink from the injection port into the ink tank, ink is present in the ink storage space such that a foreign substance in the ink present in the ink storage space is prevented from moving into the ink tank through the injection port.

13. The ink storage bottle according to claim 1, wherein the ink storage bottle further comprises a filter provided to the filling port.

14. The ink storage bottle according to claim 1, further comprising a filter provided to the injection port.

15. The ink storage bottle according to claim 1, further comprising function indicators located on an outer surface of the ink storage bottle to indicate functions of the filling port and the injection port, respectively.

16. The ink storage bottle according to claim 1, further comprising a filter provided to the filling port, and a filter provided to the injection port.

17. The ink storage bottle according to claim 1, further comprising a filter provided to the filling port;

a filter provided to the injection port; and function indicators located on an outer surface of the ink storage bottle to indicate functions of the filling port and the injection port, respectively.

18. A system comprising:

an ink ejection apparatus that includes (a) a print head and (b) an ink tank for supplying an ink to the print head, wherein the ink tank includes a receptacle for receiving the ink; and an ink storage bottle configured to replenish ink to the ink tank, the ink storage bottle comprising:

(1) a filling port from which the ink is filled;

(2) an injection port and a spout pipe connected to the injection port from which the filled ink is injected into the opening of the ink tank;

(3) a filling port placement surface in which the filling port is provided; and (4) an injection port placement surface, which is adjacent to the filling port placement surface, which forms an ink storage space together with the filling port placement surface, and, in which, the injection port is provided, wherein, in a posture of the ink storage bottle in injecting the ink from the injection port into the ink tank, the injection port is located at a higher position than is the filling port, and wherein the storage bottle and the ink tank are engaged by inserting the spout pipe into the receptacle of the ink tank.

* * * * *